United States Patent Office 3,483,068
Patented Dec. 9, 1969

3,483,068
ARTICLE EXHIBITING ANISOPANORAMIC LIGHT SCATTERING, AND COMPOSITION AND PROCESS FOR MAKING SAME
Harold C. Brill, New Castle County, Hugh C. Gulledge, Newark, and Howard L. Ramsay, New Castle County, Del., assignors to E. I. du Pont de Nemours and Company, Wilmington, Del., a corporation of Delaware
Filed Feb. 15, 1966, Ser. No. 527,443
Int. Cl. B44f 1/04; B32b 5/16
U.S. Cl. 161—3.5    11 Claims

ABSTRACT OF THE DISCLOSURE

This invention pertains to an article which exhibits anisopanoramic scattering of laterally incident light to the extent that the differential scattering index is at least 10. The article comprises a multiplicity of laterally observable, elongated, pigmentary sodium or potassium polytitanate particles having a length to width ratio of at least 10 dispersed, at least locally, in a substantially parallel mutual alignment in a solid, transparent material having a lower refractive index than the polytitanate particles.

---

Figure 1:
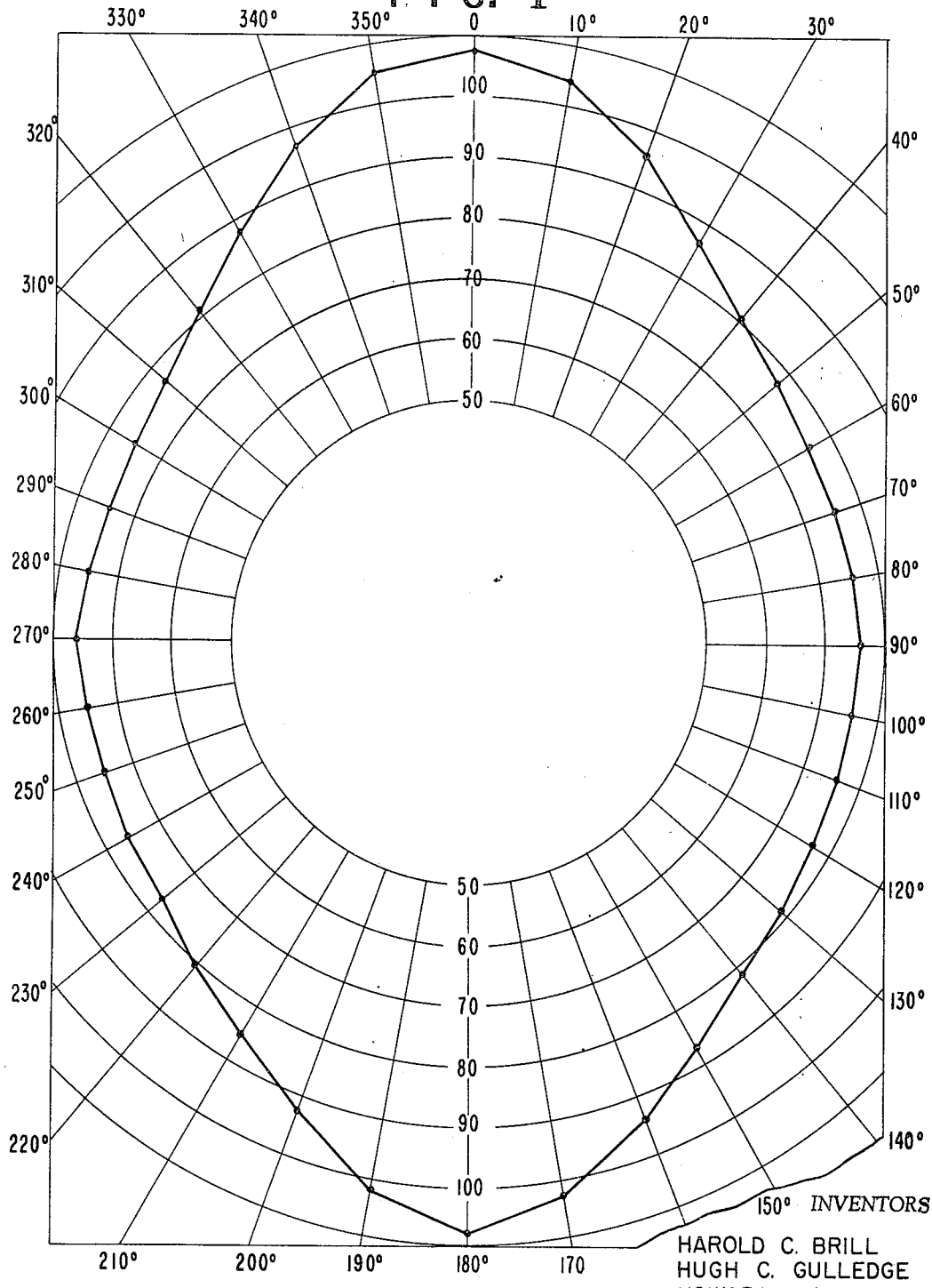

This invention relates to novel articles having the property of anisopanoramic light scattering to the extent that the differential scattering index is at least 10, and to compositions and methods useful in making them. More particularly the invention is directed to such articles comprising a laterally observable multiplicity of elongated, pigmentary alkali metal polytitanate particles dispersed, at least locally, in substantially parallel mutual alignment in a solid, transparent material having a lower refractive index than said particles and being substantially free of any dispersed gas phase, said particles having the composition $M_2Ti_nO_{2n+1}$, where M is sodium or potassium and $n$ is an integer in the range from 3 to 60, and having an average length-to-width ratio ($L:W$) of at least 10, preferably greater than 25; is further particularly directed to compositions useful in making the articles, said compositions containing only solid and liquid phases comprising a multiplicity of polytitanate particles of the type above described dispersibly incorporated in a viscous liquid medium containing a binder solidifiable to a transparent solid having a refractive index less than that of the titanate particles; and is still further particularly directed to processes for making the articles, said processes comprising subjecting a composition of the type just described to viscous flow, whereby a substantial proportion of the titanate particles are aligned substantially parallel to each other, and solidifying the viscous liquid binder while such alignment persists.

Figure 2:
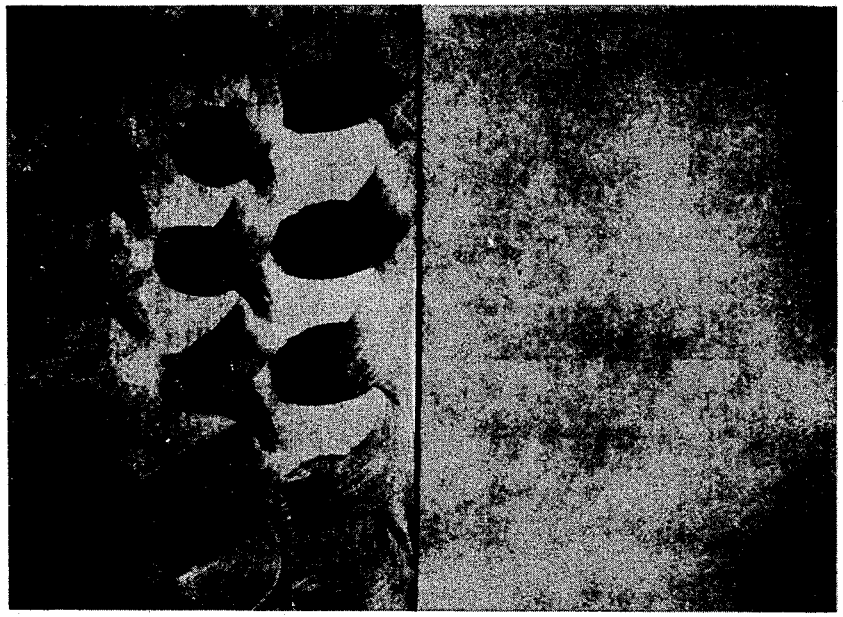

In the drawings:

FIG. 1 is a graph, on polar coordinates, on which is plotted the light reflectance of a paint film of the invention against the position of observation in a conventional reflectometer, and FIG. 2 is a graphic reproduction of another paint panel of the invention showing the optical effect of spiral brushing, in contrast to the lack of such effect in a similarly brushed conventional paint panel.

Fibrous materials such as asbestine, acicular zinc oxide and glass have already been incorporated in coating compositions and plastics to provide durability and mechanical re-enforcement. The use of these pigmentary materials is discussed in "Principles of Surface Coating Technology" by D. H. Parker (Interscience, 1965), pages 11, 76, and 84. Their effects are chiefly mechanical and no especially desirable optical effects have been attributed to their presence in such coatings.

Fibrous alkali titanates suitable for use in this invention are already known. The nature and preparation of some of these are described in U.S. Patents 2,833,620 (Gier, Salzberg and Young) and 2,841,470 (Berry). Other suitable fibers enriched with respect to chemical content of $TiO_2$ are among those described in U.S. Patent 3,331,660 (Berry and Wetzel). These various fibrous titanates have hitherto been of interest in thermal insulation and in paper, being added to the wet pulp. In general the known visual effects of fibrous pigmentary materials are the flatting of coatings and delustering of synthetic fabrics.

Now according to the present invention it has been discovered that if certain fibrous alkali metal polytitanate particles, such as some of those just described, are dispersibly incorporated in a viscous liquid medium containing a binder which is solidifiable to a transparent solid having a refractive index less than that of the titanate particles, there being present in the composition so produced only solid and liquid phases, and said composition is subjected to viscous flow to effect parallel alignment of the particles and the binder is then solidified, the article so produced exhibits an unusual optical characteristic herein referred to as anisopanoramic light scattering—that is, the property of reflecting different amounts of incident light to varying positions of observation. The fibrous alkali metal polytitanates which cause this phenomenon are those having the composition $M_2Ti_nO_{2n+1}$, where M is sodium or potassium and $n$ is in the range from 3 to 60, and having a length-to-width ratio of at least 10. The articles can be, for example, in the form of supported paint films, surface layers, or coatings, or unsupported film, sheet, filament, rod, or other physical shapes, but should be substantially free of any dispersed gas phase.

It will be understood that the compositions and articles of this invention may contain other pigmentary particles in addition to the fibrous alkali metal polytitanates already mentioned; however, such other pigmentary matter, if present, should not be more than enough to reduce the differential light scattering index (D.S.I.), as hereinafter defined, to less than about 10.

It will also be understood that the polytitanate fibers are "laterally observable" when they can be reached by light incident to the face or side of the parallel alignment. If the particles are observable from the ends only, the anisopanoramic scattering might not be seen. Moreover, an article of the invention might be enclosed in or covered with a completely transparent coating such as clear glass; the aligned particles in this instance would be laterally observable, even though such observation would be through the overlayer of clear glass. The visible portion can be a single area or a multiplicity of neighboring smaller areas having common alignment and together forming a visible portion of the area—that is, the particles are dispersed and mutually aligned, at least locally, in the transparent solid in such areas.

As a further modification of the process, the aligned portion may be subjected to further movement, either a different viscous flow to realign the elongated particles in a different direction, or a disturbing motion which dis-aligns the particles. In any case the process provides at least one area in the product exhibiting anisopanoramic scattering and provides for the creation of patterns and textures.

Anisopanoramic light scattering

The phenomenon of anisopanoramic light scattering is further described as follows. When elongated polytitanate particles are aligned according to this invention with their long axes parallel, illuminated in a direction normal to the visible portion of the surface in which they are aligned, and viewed from an angle less than 90 degrees to the direction of illumination a variation in brightness is seen as the point of view is revolved about the line of illumination as an axis or if the specimen is rotated similarly. The change in brightness is often spectacular. The change can be measured by a simple adaptation of available brightness meters or reflectometers capable of measuring comparative reflectance at a given angle.

The graph on a circular grid in FIG. 1 shows the results of such a measurement made with a Hunter Whiteness Reflectometer, D 40, using a green filter, to emulate eye response. This meter is described by Richard S. Hunter in the Journal of the Optical Society of America, vol. 50, No. 1, January 1960, pages 44 to 48. The illumination was normal to the flat specimen and the reflectance was measured at 45° with a null-point photometer device. A coated panel, prepared by a drawdown procedure, as described in Example 1, was clamped in the test position with provision for rotation about the axis of illumination in 10° steps. The first or zero position was set so that the line of reflectance to the photocell was at a right angle to the long particle axes and direction of drawdown. This position gave the maximum reflectance of 108%, relative to the MgO whiteness standard, shown at the top of the graph and again at the bottom, 180° away from the first position. As the specimen was rotated, the reflectance went through a minimum as the line of reflectance to the photocell moved through a plane parallel to the axes of the polytitanate particles.

The light scattering of these aligned particles is greatest in a direction at right angles to their long axes and least in directions approximately 90° out of phase with this maximum. The observed brightnes from such a surface is therefore not constant as the point of view is moved around the perimeter of the area being observed. This optical behavior of the aligned particles is herein called anisopanoramic light scattering. A convenient way of quantitatively expressing this phenomenon is in terms of the difference between maximum and minimum reflectance. Thus for the test plotted in FIG. 1 the "differential scattering index" (D.S.I.) is 108%—74.8% or 33.2% when observed at a 45° angle to the surface.

The alkali titanate particles

The particles useful in this invention are alkali metal polytitanates. Specific crystal types are the tetratitanates, $M_2Ti_4O_9$ and hexatitanates, $M_2Ti_6O_{13}$. In general, however, the alkali polytitanates, many of less characteristic crystal structure but having compositions in the range $M_2Ti_nO_{2n+1}$ where $n$ ranges from 3 to 60 and M is sodium or potassium, are suitable. These may be single species or mixtures. They are made under conditions which give a majority of the product in the form of the elongated particles herein specified. Such methods are illustrated in the patents previously mentioned. There is usually considerable variation in the morphology of product obtained by these methods so it is often expedient to select certain batches for use in this invention with respect to particle dimensions by electron microscope characterization or by actual trial. The term "titanate" is often used here for brevity and is considered equivalent to "polytitanate" in referring to the various types of particles used. The preferred titanates are the potassium titanates of the composition $K_2Ti_nO_{2n+1}$ where $n$ ranges from 3 to 16 and more preferably from 4 to 16.

The elongated shape of the titanate particles is essential. It makes possible the parallel alignment by means of flow and is also essential to obtaining the anisopanoramic scattering. In order to obtain a high degree of scattering of the type which provides covering power it has been found that at least one dimension must be in the 0.1 to 1.0 micron range and preferably in the 0.1 to 0.4 micron range. Such particles are herein referred to as being pigmentary.

To get good alignment it is essential to have the long dimension at least 10 times the width and preferably 25 or more. No upper limit to the length is known insofar as the application to this invention is concerned. Particles having a length-to-width ratio of 100 or more work well. Even longer particles do not detract from the effect, but it is expected that any added advantage is small. In a practical sense, it is not easy to avoid breaking fibers over about 100 microns long. Most particle preparations have been found to contain a variety of shapes and sizes. The presence of particles other than those of specified morphology probably lessens the maximum effect but still permits an outstanding alignment effect when at least 50 weight percent of the particles fall in the specified category.

It should be noted that the broad specification for the particle morphology covers two classes. In one class, referred to herein as coarse, one or both of the small dimensions are in the 0.1 to 1.0 micron range. The other, fine, class has its long dimension in this range. The length-to-width ratio specification is the same for both classes. The particles of the first class are therefore at least an order of magnitude larger than those of the second. The larger particles are preferred in that they are more readily prepared, are more applicable to common coating compositions, and disperse better. The fine particles appear to have a scattering effect which is the reverse of that shown by the larger in that the maximum reflectance is observed when viewed along the length of the aligned particles. The resulting scattering is anisopanoramic, but positioned about 90 degrees from that of the larger particle class.

In the coarse class, the particles may vary in shape within the specified limits. They may be long, thin strips or ribbons with either the width or thickness in the 0.1 to 1.0 micron range. The preferred particles however are acicular, i.e. needle-like, with the width-to-thickness ratio ranging from 1:1 to 5:1 and preferably from 1:1 to 2:1. The cross section of the preferred needles seems to be rectangular in most cases. This is not an essential requirement, however, as the section may be a parallelepiped or have a varying number of sides depending on the method of production, probably due to the minor changes in the crystal lattice parameters as the chemical composition is varied. The particles are individually transparent, having an estimated average refractive index for the potassium variety of about 2.3.

The alkali metal polytitanate particles which are applicable to this invention are prepared in a manner which gives a rather wide variety of shapes and sizes. Most of them are usually acicular but many are not within the preferred specifications. These mixtures arise because the manufacturing process employs such randomizing unit steps as crystal growth from a melt, and agitation which has a mild grinding effect. It has now been found that, since the acicular characteristic seems to predominate, if at least 50% by weight of the particles fall within the size and shape requirements they are uniquely suited to give the desired light scattering effect in the products of this invention. The minor weight fraction can have a length-to-width ratio less than 10, and be finer or coarser than the preferred particles. Good effects have been obtained when a large portion of the elongated particles were 2 microns or more in thickness particularly in the more transparent formulations such as the plastic sheets.

Alignment in a transparent medium

The essential parallel alignment of the polytitanate particles is effected in a fluid medium, but to usefully preserve such alignment the particle arrangement is fixed in a transparent, normally solid binder. This binder must be a substance which can be subjected to viscous flow in the initial stage of the process, under influence of heat or pressure or both. Such flow can be aided by the use of a vehicle, which optionally may contain solvent as is the case in the usual paint formulations. Specific procedures and products are discussed hereinafter and illustrated in the examples. The binder must, of course, be capable of ultimately assuming a solid, transparent state after alignment of the particles. Such substances are those well known in the paint, printing and plastic arts.

Binders incorporated in the coating compositions include drying oils, lacquers, polymeric substances such as latex, polyvinyl acetate and alcohol, and the like which harden or set to a transparent solid upon evaporation of the solvent or water in which they are initially dispersed. In such compositions the liquid state is the viscous condition of the binder, and the alignment of the particles is usually achieved in the wet film prior to setting or drying. In cases where the particles are to be aligned in a non-supported medium, such as plastic sheets, films or filaments, without the aid of a solvent, they are dispersed in the composition and the alignment is achieved by the flow imparted to the medium by such manipulation as extrusion, rolling, embossing, drawing, or stretching. The simpler methods of causing viscous flow tend to align the particles in parallel over straight line paths. Straight path alignment is not necessary, however, since flow in curved paths will produce the desired alignment and result in very decorative effects, some of which are illustrated in FIGURE 2.

Transparency in the ultimate solidified binder is necessary, but this need not be absolute clarity. The maximum degree of differential scattering for any particular sample of particles is observed in a very clear medium such as pure polyvinyl alcohol. However, the effect is satisfactory in media of transparency approaching a condition of translucence. As long as some transparency of the solid medium exists the process is found operable. One may, for example, employ many substances soluble in the binder in its liquid state, such as dyes for varying the tint, or agents for controlling dispersion of the particles. Agents for controlling the viscosity and setting rate of the binders, and fluorescent dyes that will intensify the scattered light in known manner, can also be used. When these agents are volatile or are otherwise removed they do not become effective components of the final binder. However, they are usually nonvolatile under the conditions of manufacture and hence remain as part of the binder. They should therefore be selected with respect to their properties, and the quantity used should be limited so that they do not render the binder opaque.

Another important feature of the process is to maintain good dispersion of the elongated particles during and after alignment. Flocculation of the particles appears to make them clump together without parallel alignment, and hence is to be avoided. It is preferred that good dispersion be obtained in the liquids of the coating composition. However, if the particles in such composition are in a dispersible condition, such that the energy and motion applied during the coating operation causes them to disperse, they are "dispersibly incorporated," and the result is satisfactory.

The presence of any dispersed gas phase in the fluid compositions interferes with the proper alignment of the polytitanate particles and is therefore avoided. Dispersion of the polytitanate fibers is sometimes effected by vigorous stirring, and if in such instances the fluid medium has a tendency to entrain air bubbles, the desired alignment will not be achieved. In a fluid system comprising polyvinyl alcohol and water, for example, in which the binder polyvinyl alcohol is solidifiable by evaporation of the water, an antifoaming agent is used in the system to avoid the presence of a dispersed gas phase in the article formed by such solidification in the presence of the polytitanate particles.

Other pigmentary components

The compositions of this invention contain, as essential pigmentary components, the elongated alkali titanate particles. In addition to these there may be included limited amounts of other pigmentary substances. The very fine dry colors having high tinctorial power, such as chrome yellow, molybdate orange, iron blues and the like, may be used in minor amounts relative to the titanate present. Prime pigments such as rutile, anatase, zinc sulfide, zinc oxide and the like as well as extenders such as barytes, calcium carbonate, asbestine and others may be used in limited quantities, especially in coating compositions to modify the mechanical properties. In any case, however, the pigmentary matter other than the titanate should be no more than enough to reduce the differential scattering index as measured by the method shown in Example 2 or an equivalent, to a value of 10.

Usually, these other white pigments are added to modify and lessen the degree of differential scattering and the amount is determined experimentally. The use of pigments or extenders which have a coagulating or flocculating effect on the titanate in the system should be avoided. The use of coarse extenders which tend to protrude from the surface or interfere with alignment of the titanate particles is not generally desired. Up to an equal weight of a white pigment, based on the titanate, can be added in some instances but the amount is usually less. An approximate definition of the upper limit of added white pigment, such as $TiO_2$, is an amount which gives a reflectance of 85% of the maximum reflectance due to the titanate in the product in question. These separate reflectance values for the two pigments, titanate and other pigment, can be measured in separate analogous products at the pigment:binder ratio to be used in the product containing both. This is just an approximation and in practice the method of experimental formulation and testing is preferred.

Coating compositions and coatings

Coating compositions of this invention are generally liquid formulations in which the alkali titanate particles, a transparent binder and usually a solvent are components. They are typically paints and are used as such with the added feautre of aligning the particles in the coating film during and/or after application and prior to the setting of the binder. The binder may be any substance which dries or hardens to a medium for holding the particles in their final alignment, having the previously specified degree of transparency.

The types of coatings to which this invention has been found applicable may be classified as paints, in which good covering power is a factor, or as more transparent finishes where covering is not especially desired but where the anisopanoramic scattering effect is superimposed upon an underlying pattern or surface. These compositions may also be formulated to give washable or non-washable coatings. Both water-base and oil-base systems are readily amenable to formulation. Such formulating procedures employ the usual paint and vehicle technology with due attention to setting or drying time and viscosity or consistency. The very fast drying formulations are not usually desired because more time often is desired, after applying the coating, to realign the particles in a pattern or texture.

Since the advantages of this invention depend upon preserving the primary alignment, and also the secondary alignment in case of patterns and textures, the coating composition must not be too limpid. Bodying agents may be added to prevent unwanted flow, for example on vertical walls, and especially when a pattern is applied by rearranging portions of the wet film; however, by allowing the paint to drip or flow under gravity parallel alignment of the acicular particles can be produced and interesting effects obtained. Any of the additives known to the paint formulating art may be employed to provide the desired consistency so long as the previously specified transparency of the ultimate binder and the dispersibility of the elongated polytitanate particles is maintained. With respect to transparency, it should be pointed out that many paint vehicles in the liquid state, notably the emulsion paints, are quite opaque. This is a temporary condition, however, and upon evaporation of the volatile portion the emulsion is broken and the binder congeals to a transparent solid.

The proportion of titanate particles, binder and volatile solvent may vary widely in these compositions. The amount of solvent is varied primarily to control the final thickness of the dried coating. The dried film, comprising the titanate and non-volatile, solid, transparent binder may contain from 0.1 to 96% by volume of polytitanate particles to give films of practical durability. Even less binder, in amounts sufficient to merely achieve adhesion of the aligned particle to the surface, will suffice in producing artistic objects.

The binders themselves are well known in the coating art. Most of them are organic in nature and include the natural drying oils, shellac etc., synthetic drying oils such as the alkyd resins and modifications thereof, the acrylics, polyvinyl alcohol, carboxymethyl cellulose, latex (natural and synthetic), and many others. Transparent inorganic binders such as water glass may also be used.

The liquid coatings of this invention can be applied initially to a surface by any means including spraying. The sprayed coating is just about devoid of any parallel alignment of the titanate particles, but while wet it can be caused to flow to produce such alignment. This secondary flow can be caused in local areas, to produce patterns or textures, by such means as brushing, daubing, stippling with various materials, rolling, or drawing, using any of the known techniques for manipulating a wet film. Patterned rubber rollers are particularly useful. Textured surfaces having anisopanoramic scattering, which is different from one small area to another, are produced with felt or long haired rolls or brushes. Even permitting the wet paint to flow under the force of gravity will produce alignment of artistic value.

The primary application can also be made with aligning means. These means include practically every means available except spraying. Probably the maximum degree of differential scattering is obtained by applying a thin film by parallel brush strokes or with a drawdown blade, as illustrated in the examples. Some of the best decorative effects are obtained by first coating the surface with flow in one direction (parallel brushing) and then re-arranging the alignment in various areas to form a pattern. This can be done with a design roller or similar instrument or a brush. These areas, due to the different direction of flow, have anisopanoramic scattering which is out of phase with the background and the whole presents an amazing three dimensional or tapestry effect. These patterned surfaces often have a strongly embossed appearance and yet, surprisingly, they are substantially smooth to the touch.

Plastic articles

Transparent articles, in which the elongated titanate particles are imbedded in parallel alignment due to flow of the mixture under heat and/or pressure, constitute other products of this invention. Such products do not usually employ a solvent in the preparative process, although the titanate particles could be incorporated in the early stages of the plastic manufacturing process, e.g. before polymerization, where a solvent may be present. The titanate can be mixed with the plastic while in the molding powder stage, or with the molten plastic.

Once the particles are incorporated in the plastic, which is analogous to the binder in the coating compositions, to obtain the novel scattering effect it is only necessary to cause the desired viscous flow before the plastic sets. This flow is obtained by such means as pressing, rolling, or extruding. Here, too, the differential scattering is greatest in thin clear films, but the plastic compositions may also be modified by adding colors and other pigments within the limits set. Plastic compositions which are slow-setting or can be melted can also be used as solvent-free coatings. For example, the epoxy resins which set by controlled catalytic action can be used. The titanate can be incorporated in such resins prior to introduction of the catalyst and thus form stable mixtures which later can be mixed with the catalyst, applied and aligned before the catalytic hardening occurs.

Inorganic plastics, although relatively few, can also be used as the transparent solid. The titanates can be dispersed in a low melting glass and manipulated to give the desired alignment. These compositions are well suited for decorative printing or designs on glass.

The plastic films of this invention are particularly well adapted for use as light-polarizing filters. Titanate particles, preferably those having a high degree of acicularity, are incorporated and aligned in one direction, preferably parallel to the surface of the film or sheet. Relatively good transparency is desired and hence particles having rather coarse diameters and therefore lacking in strong opacifying power are used. Light passing through such films is polarized. Two such films superimposed, and oriented so that the alignment directions are at right angles, are relatively opaque. This polarizing effect is believed akin to light scattering since light waves having the electric vector lying in one plane are transmitted, while others are scattered and perhaps absorbed. It is not understood whether the phenomenon of varying brightness found in the products of this invention is due at least in part to a polarizing mechanism or involves a separate type of light scattering. It appears quite likely that the two mechanisms cooperate in producing the observed light scattering and the "anisopanoramic" term is used here to include both.

The articles of this invention, after alignment of the particles, exhibit unique reaction to polarized light. The anisopanoramic effect is enhanced over that observed in non-polarized light. Plane-polarized light appears to be preferable. A more dynamic phenomenon is observed if the aligned composition is illuminated by a beam of rotating plane-polarized light. Such a beam can be obtained by placing a "Polaroid" filter in front of a source of light, such as a slide projector, and rotating the filter. For example, a surface can be coated with a composition of this invention by brushing in straight parallel strokes, and can be illuminated by rotating incident polarized light, whereupon the surface will appear alternately bright and dark. When the particles in the surface coating are in curved parallel alignment the same variation in brightness is seen, but in addition there is marked variation in the apparent size of the light and dark areas. This gives the impression of movement, usually of an expanding and contracting nature. In the case of transparent materials, such as when the particles are aligned in a sheet of clear plastic, this effect of polarized light is seen when illumination is made from either front or back. The effect in any case seems more pronounced if the angle of incidence of the light is less than 90°. This method of display is readily adapted to use in the field of art, especially advertising and the decorative arts.

Use as an art medium

Although thin sections give the strongest effect, the articles of this invention are not limited thereto, since the effect is visible at the surface of an otherwise opaque object. The use of these coating compositions as an art medium deserves attention. In paintings, for instance, although the paint films are relatively thick the variations in light scattering from the various differently manipulated areas produce a new type of painting. Once the film is applied and while still in the wet state, almost any movement or flow caused by a touch will produce an area which interacts with light in a manner contrasting with neighboring areas. It is only necessary that each area or closely associated group of areas, so manipulated, be large enough to see. Paints containing the acicular polytitanates are particularly adaptable to modern art because the variable light interaction produced by random manipulation such as stipping, even with a sponge, gives depth and changing shades not obtained with known paints even with exhaustive work.

Other uses

The novel compositions can be formulated as inks, especially for rotogravure, letter press, silk screen, flexographic and lithographic processes, wherein alignment can be accomplished by relative motion of the transfer surfaces. They are also applicable to paper coating. In particular, wallpaper and wallboard can be coated and decorated with attractive designs. Such large scale coating operations can be carried out in mechanized production line manner.

One of the most outstanding effects obtained by these coating compositions is the appearance of the three-dimensional effect such as that described in Example 2 and when a generally parallely aligned wet base coat is rolled with a texture roll or one imparting a design to the wet film. While the depth illusion is strong, the surface is substantially flat or smooth and is easily repainted. It, therefore, displays the advantages of the known texture paints without the disadvantages of difficult repainting and dirt accumulation. The novel textured effects are especially useful in covering underlying defects in wall surface such as joints in dry-wall construction.

Water soluble paints for finger painting and the like are immensely enhanced by pigmenting with the alkali titanates according to this invention. The more transparent coating compositions can be applied to transparent bases such as glass or plastic sheets with unusual optical effect obtained by both reflected and transmitted light. Plastic objects having these acicular particles aligned in them may include injection-molded parts and objects of art. Plastic filaments containing titanates aligned longitudinally by the flow during extrusion and drawing exhibit the novel effect and offer the opportunities of weaving patterned fabrics from them. Crayons containing the titanates can be prepared and marks made by them exhibit a degree of the novel light scattering effect due to alignment as the mark is made.

The application of this invention to products which are treated by embossing procedures is possible. Sheets of plastic materials useful as automotive upholstery and seat covers, shower curtains, table cloths and the like are examples. To prepare such products the acicular titanate is incorporated in the plastic medium and the sheeting prepared, usually by rolling. The titanate particles become aligned in the direction of rolling and cause the overall anisopanoramic effect. By embossing this sheet by means of rolls or plates a secondary alignment of the particles corresponding to the pattern on the rolls or plates is obtained.

The invention will be better understood by reference to the following illustrative examples.

EXAMPLE 1

This example illustrates in a quantitative way the degree of anisopanoramic light scattering measured on a water-based composition containing, as the sole pigmentary substance, acicular potassium hexatitanate particles, a major portion of which have average short dimensions in the .2 to .8 micron range and are about 10 to 15 microns long. The composition was passed once through a micropulverizer to disperse lumps, and in this process many originally longer needles were broken. The product exhibited a medium differential scattering index.

The coating composition was prepared by adding the following substances, in the order given, to a running Cowles Dissolver.

|  | Grams |
|---|---|
| Distilled water | 2900 |
| Potassium titanate (added in 15 min.) | 160 |
| Victamide (25% soln.) dispersing agent | 30.7 |
| Colloid 581 B antifoaming agent | 4.0 |
| Polyglycol P 1200 | 5.0 |
| Methocel (50,000 cps.) binder | 38.1 |

Igepal CO 630 wetting agent, 16.0 cc.

Total stirring time—30 min.

This composition had a viscosity of 120 KU, determined as described in Gardner, "Paint Testing Manual," 12th ed., 1962, pp. 178, 179.

A panel coated with a flat white lacquer having a reflectance of 80% vs. the MgO standard was prepared and dried. A film of the above composition was then applied over this base, using a drawdown blade set with a 0.006 inch clearance above the base film, and air dried. The panel was then placed in a Hunter Whiteness Reflectometer, previously described, and the panel rotated until a maximum reading of 108% vs. the standard MgO was obtained. This position of maximum reflectance was such that the direction of drawdown was normal to the direction of light reflected to the photocell as nearly as could be observed. The panel was then rotated, with readings taken every 10 degrees and plotted on the full circle grid shown in FIG. 1. The actual data are as follows, the settings being in degrees and the percentages being vs. the MgO standard.

| Setting | Percent | Setting | Percent | Setting | Percent | Setting | Percent |
|---|---|---|---|---|---|---|---|
| 0 | [1]108.0 | 100 | 75.4 | 190 | [1]102.5 | 280 | 74.8 |
| 10 | [1]104.5 | 110 | 75.6 | 200 | 93 | 290 | 74.8 |
| 20 | 95.3 | 120 | 76.5 | 210 | 85.8 | 300 | 75.6 |
| 30 | 86.6 | 130 | 78.2 | 220 | 80.8 | 310 | 77.8 |
| 40 | 80.5 | 140 | 81.2 | 230 | 77.7 | 320 | 81.5 |
| 50 | 77.2 | 150 | 86.9 | 240 | 76.1 | 330 | 88.1 |
| 60 | 75.4 | 160 | 94.5 | 250 | 75.5 | 340 | 97.1 |
| 70 | 74.8 | 170 | [1]103.1 | 260 | 75.3 | 350 | [1]105.7 |
| 80 | 74.8 | 180 | [1]108.0 | 270 | 75.1 | 360 | [1]108.0 |
| 90 | 75.1 | | | | | | |

[1] These high values were beyond the instrument scale and were extrapolated by calibration of the needle deflection from the null point. The measured difference was strikingly visible as the panel was observed and rotated through 90°, changing from bright white to gray.

EXAMPLE 2

This example illustrates a method of realigning titanate particles in a wet coating, showing the strong three-dimensional effect of parallel realignment along a curved path as compared with the same procedure using an ordinary paint.

Two formulations were prepared using a procedure very similar to that in Example 1 except that the final three components were added under milder stirring conditions. Samples of each paint were tinted with a water dispersible "Monastral" blue for use in a brush-out test.

|  | No. 1, grams | No. 2, grams |
|---|---|---|
| Potassium Titanate T-25 | 480.0 | |
| Water | 2870 | 2870 |
| TiO$_2$ pigment (commercial) | | 480.0 |
| Victamide, 25% soln | 96.0 | 96.0 |
| Colloid 581 B | 8.6 | 8.6 |
| Polyglycol P 1200 | 11.0 | 11.0 |
| Methocel 50,000 | 30.0 | 30.0 |
| Reduction: | | |
| Ethylene glycol | 82.0 | 82.0 |
| B-60 A (acrylic emulsion) | 683.0 | 683.0 |
| Super-Ad-It (mildew preventive) | 13.6 | 13.6 |
| Viscosity | 86 KU | 81 KU |
| Differential scattering index | 24.2 | 0.3 |

The tinted samples were spread on 44 x 28 inch cardboards with white base coats, using parallel brush strokes in each case. Also, in each case, while the film was still fresh, spiral designs were made with a 3" brush, using a single pass for each spiral, in the same manner on each panel. The panels were air dried.

The left-hand half of FIG. 2 shows the outstanding optical effect produced by the formulation containing potassium titanate as pigment, whereas the right-hand half shows only vague indication of the spirals as brush marks in the conventional TiO$_2$ paint. Although FIG. 2 is a lithographic reproduction of a photograph of the panels, it lacks the dynamic character of the light and shadow interplay seen as an observer's eye is moved about the panel.

EXAMPLE 3

This example shows the effect of good dispersion on the differential scattering index.

A paint was formulated using potassium titanate prepared as approximately the tetratitanate and leached with water to remove potassium oxide and leave a product the major portion of which was acicular and had a composition corresponding approximately to the hexatitanate.

|  | Grams |
|---|---|
| Water | 283 |
| Potassium titanate | 50 |
| "Calgon" | 1 |
| "ASE–60" 28% acrylic resin | 40 |

The well-mixed composition was applied to a white cardboard panel with a drawdown blade giving a 0.006 inch wet film thickness. The film was dried and the differential scattering index measured and found to be 30.

EXAMPLE 4

This example compares the differential scattering index (D.S.I.) of the alkali titanates useful in this invention with other acicular particles selected to be as close as possible to the size and shape specified for the alkali titanates. The coatings were formulated using methyl cellulose as the transparent binder with the ratio by volume of pigment to binder being such that the pigment occupied 60% of the volume of the dried coating. The various types of particles were dispersed in the media using more or different dispersing agents when necessary. The characteristic dimensions are indicated where available. They were estimated from photographs. The vehicle chosen was a water solution of methyl cellulose. In cases where the particle dimensions were not measured, they were known to be fibrous in nature and of size acceptable for commercial paint use. The paints were prepared, drawn down on panels, and the differential scattering index measured as previously described. The results are tabulated below.

| Pigment | Characteristic dimension | D.S.I. |
|---|---|---|
| Potassium titanate | D=0.20 L/D=+100 | 40 |
| Do | D=0.40 L/D=15 | 21.7 |
| Sodium titanate | D=0.30 L/D=15 | 15.7 |
| Potassium titanate | D=1.2 L/D=20 | 15.0 |
| Calcium silicate (Wollastonite) | Not measured | 2.3 |
| Magnesium silicate | D=<0.2 L/D=+100 | 1.5 |
| Asbestine "625" | Not measured | 0.8 |
| Acicular rutile | L/D=<10 | 0.0 |

D=ave. diameter, L=ave. length. The particles were all acicular (needle-like) with the two small dimensions approximately equal.

EXAMPLE 5

This example illustrates the effect of acicular potassium titanate at very low pigment-binder ratio in a film of transparent nature, i.e. not only is the binder transparent but the final film permits the color of the base to show through.

An 0.495 gram portion of acicular potassium titanate having an average diameter of 0.25 micron and an average length of 40 microns was mixed with 4.0 grams of water containing 0.03 gram of "Calgon." This slurry was then mixed with 900 grams of an aqueous emulsion of polyvinyl acetate (55% solids) and 0.5 gram of "Monastral" Green Paste GW 749–P (Du Pont). This fluid composition was applied to aluminum foil using a Bird Film Applicator (0.012-inch clearance), and the film was air-dried. The general appearance of this coating was glossy, transparent light green. The differential scattering index measured at 45° was 40. The sheet was cut into 2-inch squares and pasted on a cardboard with the direction of drawdown arranged in checkerboard fashion. When viewed at about 45° to the plane of the surface and rotated about an axis normal to the surface, the alternating squares were seen to change quite abruptly from a bright silvery green to a darker shade of green.

EXAMPLE 6

This example illustrates the use of fibrous potassium titanate in a paint formulation giving a flat, washable, dried film. The following ingredients were mixed in a Cowles Dissolver.

|  | Grams |
|---|---|
| Water | 2862 |
| Potassium titanate (D=0.25μ, L=40μ) | 480 |
| Victamide, 25%, sequestering agent | 115 |
| Colloid 581 B | 8.6 |
| Polyglycol P 1200 | 7.5 |
| Methocel 90 HG, DGS (50,000 cps.) emulsifier | 35.0 |
| Ethylene glycol | 67.0 |
| Acrylic emulsion, B60A, Rohm & Haas | 672.5 |
| Super-Ad-It, Mildew Proofing | 13.6 |

When these ingredients were thoroughly mixed and the titanate well dispersed, the composition was brushed onto a panel using straight parallel brush strokes in one direction during the final spreading of the wet film. After air drying, the differential 45° scattering index was found to be 20. Furthermore this film, although exhibiting a flat surface, was found to withstand extensive washing before failure.

EXAMPLE 7

This example describes a manner in which these novel coating compositions can be used to obtain unusual artistic effects. The potassium titanate used had the characteristic particle dimensions: ave. dia. 0.25μ, lengths ranging from 10 to 100μ for the major weight portion of the sample. A lesser portion of fines were present, being of average length of not over 10μ. The same components as used in Example 1 were mixed in a Cowles Dissolver, in the same proportions, except that 14 grams of "Super-Ad-It" mildew-proofing agent was included.

Portions of the resulting paint were tinted blue, red, yellow and nearly black, leaving one portion white. These paints, used singly or in combination, were placed in more-or-less random splotches on Whatman board by merely pouring or dripping. When composite films of this variety were dried the alignment of the titanate fibers, due to viscous flow, gave interesting reflectance patterns and three dimensional appearance not seen with ordinary paints.

Such a wet composite film was stippled with a sponge and allowed to dry. As a result, numerous small areas of alignment, caused by flow at points where the sponge left the film, took on a subdued scintillating appearance as the observer moved in front of the painting. A figure, painted normally amid this background gave the overall effect of a figure placed in a deep, moving landscape. In a similarly prepared painting, a dark gray background area was given a strong cubic effect by a few short straight strokes of a brush at different angles in adjacent areas before the film dried. Another board was used for a scene composed of masses or areas roughly suggestive of clouds, sea, cliffs and trees. This was done very quickly with no effort to produce any detail. While this film was still wet, a piece of drawing paper was laid on in contact with the wet film and then lifted off. The minute separate areas of flow caused by separating the paper caused interesting alignment of the fibers and a remarkable effect of interesting fine detail in the dried picture. The effect of light and shade not only gave pleasing detail or texture to the different objects, but the interplay of light caused by the anisopanoramic scattering from the many points of different alignment gave a dynamic sense of depth not obtainable in ordinary paint even with a tremendous amount of detailed work. It was apparent from these results that an artist skilled in handling this new medium could enter a new field of creative art.

EXAMPLE 8

This example illustrates the incorporation of acicular potassium titanate in thermoplastic materials and the production of decorative effects in sheet products due to alignment of the titanate particles.

The following ingredients were thoroughly mixed by working on a two-roll Bolling rubber mill at a roll temperature of 340° F. The peripheral speed of the front roll was 45 ft./min., the back roll, 35 ft./min.

| | Grams |
|---|---|
| Polyvinyl chloride powder | 100 |
| Dioctyl phthalate (plasticizer) | 40 |
| Paraplex G62 | 10 |
| X-54 (stabilizer) | 3 |
| Stearic acid (lubricant) | 0.25 |
| Carbon black (dispersion, 20% solid) | 0.30 |
| Potassium titanate (ave. dimen. .25 D x 40 L, micron) | 5.00 |

After mixing, the material was taken from the mill as a 35 mil sheet. The anisopanoramic scattering effect was clearly visible. Differential scattering was measured in a Gardner Reflectometer using a green filter in which the illumination was directed onto the film at 45° and the reflected light metered in a direction normal to the film. A maximum differential index of 27.1 was measured. The lowest reflectance was obtained when the incident light was striking the film generally along the direction of rolling. A similar preparation using commercial rutile pigment instead of the potassium titanate gave a zero scattering differential.

EXAMPLE 9

A film was prepared in the same manner as in Example 8 with the following exceptions:

(1) The carbon colorant was not used.
(2) Seven instead of five grams of potassium titanate were used.
(3) The potassium titanate particles were larger, the average dimension being about 1 micron thick and 100 microns long.
(4) The film produced was 6.5 mils thick.

A portion of this film was placed over a white ceramic plate and reflectance measured as in Example 8. The maximum reflectance differential was 31.1. The differential for the backing plate alone was zero. This film was quite transparent and it was noted that light, on transmission through it, was polarized. When observed with a Nicol prism the transmitted light was nearly extinguished when either was rotated to produce minimum transmission. The film thus acts as a polarizing filter and could be used either as the polarizer or analyzer of an optical polarimeter.

EXAMPLE 10

This example illustrates the application of this invention to an oil based paint, more specifically an air dried soya bean oil modified alkyl paint.

The following formulation was prepared by thorough mixing in a slow-speed laboratory paint mixer.

| | Parts by weight |
|---|---|
| Acicular potassium titanate | 257 |
| "Aroplaz" 2502 | 567 |
| 24% lead naphthenate | 4.1 |
| 6% cobalt naphthenate | 22 |
| Mineral spirits | 131 |
| Anti-skinning agent | 1.0 |

The resulting paint was drawn down on a panel to a film of 6 mil thickness. On drying, the differential scattering index was found to be 18. This is a low value and illustrates the fact that gloss paints, where the pigment binder ratio is low, exhibit the phenomenon to a lesser degree than flat paints.

EXAMPLE 11

This example illustrates the use of potassium titanate in a lacquer. The following composition was prepared as in Example 10.

| | Parts by weight |
|---|---|
| Acicular potassium titanate | 500 |
| "Acryloid" B-44[1] (acrylic resin) | 1780 |
| Toluol (to give painting consistency). | |

[1] A 40% solution in toluol.

A film of this lacquer on glass exhibited a low index, similar to that found in Example 10. Transmitted light however was strongly polarized.

We claim:

1. An article which exhibits anisopanoramic scattering of laterally incident light to the extent that the differential scattering index is at least 10, said article comprising a laterally observable multiplicity of elongated, pigmentary alkali metal polytitanate particles dispersed, at least locally, in substantially parallel mutual alignment in a solid, transparent material having lower refractive index than said particles and being substantially free of any dispersed gas phase, said particles having the composition $M_2Ti_nO_{2n+1}$, where M is sodium or potassium and $n$ is an integer in the range from 3 to 60, and having an average length-to-width ratio of at least 10.

2. An article of claim 1 in which the major portion of the polytitanate particles have at least one dimension in the 0.1 to 1.0 micron range.

3. An article of claim 1 in which the length-to-width ratio of the polytitanate particles is at least 25.

4. An article of claim 1 in which in the polytitanate composition formula M is potassium and $n$ is in the range of 4 to 16, inclusive.

5. A composition, useful in making an article of claim 1, said composition containing only solid and liquid phases and comprising a multiplicity of alkali metal polytitanate particles having the composition $M_2Ti_nO_{2n+1}$, where M is sodium or potassium and $n$ is an integer in the range from 3 to 60, and having an average length-to-width ratio of at least 10, said particles being dispersibly incorporated in a viscous liquid medium containing a binder solidifiable to a transparent solid having a refractive index less than that of the titanate particles.

6. A composition of claim 5 in which the major portion of the polytitanate particles have at least one dimension in the 0.1 to 1.0 micron range.

7. A composition of claim 5 in which the length-to-width ratio of the polytitanate particles is at least 25.

8. A composition of claim 5 is which in the polytitanate composition formula M is potassium and $n$ is in the range of 4 to 16, inclusive.

9. A composition of claim 5 in which the liquid binder is a paint vehicle.

10. In a process for producing an article which exhibits anisopanoramic scattering of incident light, the steps comprising (1) dispersing a multiplicity of alkali metal polytitanate particles having the composition $M_2Ti_nO_{2n+1}$, where M is sodium or potassium and $n$ is an integer in the range from 3 to 60, and having an average length-to-width ratio of at least 10, in a viscous liquid medium containing a solidifiable binder, (2) subjecting the dispersion to viscous flow, whereby a substantial proportion of the polytitanate particles therein are aligned with their long axes substantially parallel to each other, and (3) solidifying the binder in the viscous liquid dispersion while such parallel alignment persists.

11. A process of claim 10 in which, following step (2) but prior to step (3), an alignment different from the alignment imparted by step (2) is imparted to a portion only of said particles.

(References on following page)

References Cited

UNITED STATES PATENTS

| | | | |
|---|---|---|---|
| 2,123,902 | 7/1938 | Land | 264—108 XR |
| 2,443,918 | 6/1948 | Lahousse et al. | 350—126 XR |
| 2,628,156 | 2/1953 | Merker et al. | 23—51 |
| 3,328,117 | 6/1967 | Emslie et al. | 23—51 |
| 3,331,658 | 7/1967 | Lewis et al. | 23—51 |
| 3,331,660 | 7/1967 | Berry et al. | 106—55 XR |

OTHER REFERENCES

Pearce, Marvin James: Modern Automobile Painting, David McKay Co., Philadelphia, 1927, p. 104.

ROBERT F. BURNETT, Primary Examiner

L. M. CARLIN, Assistant Examiner

U.S. Cl. X.R.

161—168; 260—37; 264—108